United States Patent [19]

Frieling

[11] Patent Number: 4,669,487

[45] Date of Patent: Jun. 2, 1987

[54] IDENTIFICATION DEVICE AND METHOD

[76] Inventor: Edward Frieling, 5590 Boca Delray Blvd., Delray Beach, Fla. 33445

[21] Appl. No.: 792,781

[22] Filed: Oct. 30, 1985

[51] Int. Cl.[4] .............................................. G01K 9/00

[52] U.S. Cl. ........................................ 128/774; 382/2; 340/825.3; 33/147 L

[58] Field of Search .................... 128/774, 782; 382/2, 382/4; 340/825.3, 825.34; 33/147 L, 147 N, 512

[56] References Cited

U.S. PATENT DOCUMENTS

| | | | |
|---|---|---|---|
| 3,576,537 | 4/1971 | Ernst | 382/2 |
| 3,576,538 | 4/1971 | Miller | 382/2 |
| 3,585,594 | 6/1971 | Schwend | 235/380 |
| 3,614,737 | 10/1971 | Sadowsky | 382/2 |
| 3,639,905 | 2/1972 | Yaida et al. | 382/2 |
| 3,648,240 | 3/1972 | Jacoby et al. | 340/825.34 |
| 3,668,633 | 6/1972 | Sadowsky | 382/4 |
| 3,721,128 | 3/1973 | Thurman | 340/825.3 |
| 3,750,294 | 8/1973 | Belke et al. | 33/147 L |
| 4,107,775 | 8/1978 | Ott | 382/2 |
| 4,528,756 | 7/1985 | Ichihara | 33/147 L |
| 4,573,193 | 2/1986 | Shuts et al. | 382/2 |

FOREIGN PATENT DOCUMENTS

| | | | |
|---|---|---|---|
| 136766 | 7/1979 | Fed. Rep. of Germany | 33/147 L |
| 56-61605 | 5/1981 | Japan | 33/147 L |
| 55-26907 | 9/1981 | Japan | 33/147 L |

*Primary Examiner*—Edward M. Coven

*Attorney, Agent, or Firm*—Laff, Whitesel, Conte & Saret

[57] ABSTRACT

A method and apparatus designed for verifying the identity of a person, for credit card authorization and other purposes, involves the measurement of the thickness of the knuckles and also the longitudinal distance between knuckles. The apparatus simultaneously takes a series of length and width measurements, and feeds them to a computer which is programmed to process the raw data and make comparisons to a standard previously recorded. Techniques for increasing the accuracy of the determination are also disclosed.

27 Claims, 7 Drawing Figures

IDENTIFICATION DEVICE AND METHOD

This invention relates to the field of personal identity verification, and is particularly suitable for use in preventing credit card fraud.

BRIEF SUMMARY OF THE INVENTION

There are a number of situations in which it is necessary or desirable to determine the identity of an unknown person, or to screen out persons who fraudulently claim to be someone else. One example of the latter type of situation is the protection of secured areas in an industrial plant, to which access is restricted for reasons of trade secrecy. Another, and even more common, example is preventing the use of stolen or lost credit cards for unauthorized purchase of goods.

A wide variety of methods have been used to verify personal identity in such situations. Many of these methods involve the use of bodily characteristics as the criterion of identity, such as fingerprints. Fingerprint systems are reliable, but are also difficult and expensive to implement. In many ordinary applications a lesser degree of reliability is acceptable, and more cost-effective.

Accordingly, some workers have attempted to devise systems which are less expensive and technologically less demanding, but which are reliable enough for ordinary applications such as everyday credit card authorization. In some of these systems it is the measurement of finger proportions which is relied on as an indication of identity. In Ernst U.S. Pat. No. 3,576,537, Miller U.S. Pat. No. 3,576,538, Schwend U.S. Pat. No. 3,585,594, Jacoby U.S. Pat. No. 3,648,240 and Thurman U.S. Pat. No. 3,721,128, for example, the length of an individual's fingers along its longitudinal axis is measured and used as a test of personal identity for credit card authorization purposes The present invention, on the other hand, employs measurements of the width of the individual's fingers along a transverse axis as the criterion of personal identity. This measurement has proven to be adequately reliable for credit card authorization, and can be performed inexpensively.

In accordance with this invention, the identity of an unknown person is verified by measuring the thickness of one or more joints of a test finger of a known person, and optionally also the distance between the finger joints; then storing the measurement(s), measuring the same dimension(s) of the test finger of an unknown person, comparing the dimension(s) relating to the known and unknown persons to determine the degree of similarity therebetween, and deciding whether that degree of similarity is acceptable as an indication of identity.

In one form of the invention, the thicknesses of a selected one of the finger joints along two different axes are measured and compared and used as a basis for the decision.

As a refinement, the thickness of a selected one of the finger joints is measured and compared and used as a basis for decision, and a procedure may be used for compensating for short-term changes in joint thickness which employs the thickness another finger joint as a check.

Another procedure may be used for compensating for long-term changes in finger dimensions. This involves calculating the difference(s) between the measured dimension(s) and the corresponding stored dimension(s), and modifying the stored dimension(s) by algebraically adding thereto at least a selected fraction of the difference(s).

In measuring the thickness of a selected joint of a selected finger of a known person and of an unknown person, a preferred procedure is to measure the thickness at a plurality of data points including the location of the selected finger joint and a range of locations in front of and behind that joint, and to measure the displacement of each of the locations along the longitudinal axis of the test finger. Then the comparison step may include calculating a first curve of a selected type which fits the data points best for each of the persons, establishing criteria of closeness between the curves and the data points, discarding any of the data points which do not meet those criteria, calculating a second curve of a selected type which fits the remaining data points best for each of the persons, determining a peak value for each of the second curves as an indication of the thickness of the selected finger joint for each of the persons, and comparing the peak values to determine the degree of similarity therebetween.

In a particular implementation of the invention, at least one of the curves employed is a parabola. The method of least square fit may be used to fit the parabola to its constituent data points.

Calculating one of the curves may comprise the steps of determining a peak data point from among all the data points, and selecting the curves to pass through the peak value data point. The step of determining a peak data point from among all of the data points may comprise the steps of selecting a preliminary peak data point, selecting a predetermined number of the data points on either side of the preliminary peak data point, calculating the average coordinates of the preliminary peak data points and the selected points on either side thereof, and employing the average coordinates as the coordinates of the peak data point through which the curve passes.

In addition to measuring and comparing the thickness of a first finger joint, the invention contemplates measurement and comparison of the thicknesses of a second joint of the fingers of the known and unknown persons, and optionally also the respective distances between the first and second joints of the fingers of the known and unknown persons. Such a multi-faceted comparison improves the reliability, at relatively low incremental cost.

The apparatus aspects of the invention contemplate means for measuring the finger dimension(s), means for storing the dimension(s) of the known person, means for comparing the dimension(s) of the unknown person to the corresponding stored dimension(s) to determine the degree of similarity therebetween, and means for determining whether the degree of similarity is acceptable as an indication of identity between the known and unknown persons.

The measuring means may comprise a pair of jaw means, means movably mounting at least part of the jaw means for opening and closing movement, means for opening the moveable jaw means to admit the finger therebetween, means yieldably biasing the moveable jaw means toward a closed position whereby to follow the contours of the finger as it is moved longitudinally between the jaw means, and transducer means responsive to the moveable jaw means for providing an electrical jaw displacement signal representing the instantaneous displacement of the moveable jaw means during the finger movement, whereby the profile of the jaw displacement signal during the time of the finger movement represents the thickness contour of the finger.

The moveable jaw means may comprise a slide member, in which case the mounting means comprises guideway means slideably mounting the slide member for linear motion of the moveable jaw means toward and away from the other of the jaw means, the transducer means if of the type requiring a rotary drive, and includes rotary drive gear means, and the moveable jaw means has coupled thereto linear drive rack means in driving engagement with the rotary drive gear means for operation of the transducer means by the linear motion of the moveable jaw means.

Solenoid means may be magnetically coupled to the slide member, and alternating current energization may be supplied to the solenoid means to apply a magnetic dither impulse to the slide member whereby to reduce frictional inaccuracies in the joint thickness measurement.

Preferably there is data processing means responsive to the jaw displacement signal and arranged to determine a peak value attained by the thickness contour whereby to determine the thickness of one of the finger joints, and the data processing means is arranged to compare the peak values relating to the known and unknown persons respectively whereby to determine the degree of similarity between the thicknesses of one of their finger joints.

The data processing means may be arranged also to determine second peak values of the thickness contour and to compare the second peak values relating to the known and unknown persons respectively, to determine the degree of similarity between the thicknesses of another of their finger joints.

There may also be means for sensing the degree of insertion of a finger into the apparatus, and transducer means responsive to the finger insertion sensing means for providing an electrical signal proportional to the degree of finger insertion; and the data processing means may be arranged to receive the finger insertion signal, to determine the finger displacements which are correlated with each of the peak values of the thickness contour, and to subtract one of the finger displacement values from the other whereby to calculate the distance between the finger joints of one of the persons. In that case the data processing means would be further arranged to compare the joint separation values relating to the known and unknown persons respectively, to determine the degree of similarity.

The insertion sensing means may comprise finger support means, and means mounting the finger support means for linear motion in response to insertion of a finger into the apparatus, and the insertion-responsive transducer means may be of the type requiring a linear drive, and including linear drive means coupled to the finger support means for linear movement therewith.

DETAILED DESCRIPTION OF THE PREFERRED EMBODIMENTS

Figure 1:
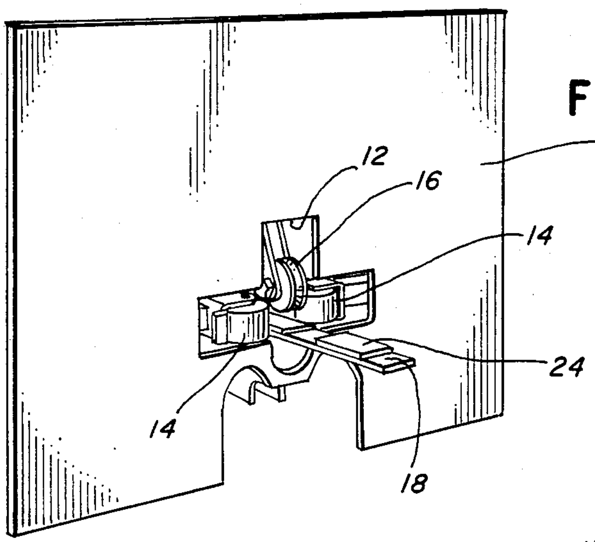
FIG. 1 is a front perspective view of the finger measurement station of a personal identification device in accordance with this invention.

FIG. 1 illustrates a finger measurement device incorporating a front panel 10 formed with an opening 12 which defines a finger measurement station. Just behind the opening 12 are a pair of jaws in the form of two horizontally opposed rollers 14 which are operable to receive between them the finger of a human being for the purposes of measuring the horizontal thickness thereof. An optional third roller 16 may be provided for measurement of the vertical thickness, in the event that this additional measurement is incorporated into the procedure for personal identification.

Between the horizontal measurement rollers 14, and below the vertical measurement roller 16, is a finger support plate 18 on which the finger to be measured is placed, in the manner illustrated in FIG. 2. The support plate is suitably mounted for longitudinal movement in a direction perpendicular to the panel 10, least one of the rollers 14 is suitably mounted for horizontal movement toward and away from the other (as indicated by arrow 21), and the roller 16 is suitably mounted for vertical movement toward and away from the support plate 18 (as indicated by arrows 23).

Consequently, finger 20 and the support plate 18 can be moved forward together, as indicated by arrow 22, to introduce the finger 20 into the panel opening 12 and insert it between the rollers 14, and also between the roller 16 and the support plate 18. Rubber pads 24 are affixed to the upper surface of the plate 18 to assure the requisite frictional engagement between the finger 20 and the plate. As the finger is inserted into the panel opening 12, the moveable roller 14 moves horizontally away from the stationary roller 14 to accommodate the horizontal width of the finger 20, and the roller 16 moves upwardly to accommodate the vertical width of the finger.

Thus the total displacement of the rollers 14 from each other at any particular moment is a measure of the horizontal thickness of the particular part of finger 20 which is between those rollers at that moment, and the vertical displacement of the roller 16 at any particular moment is a measure of the vertical thickness of the particular part of finger 20 which is between that roller and the support plate 18 at that moment.

Moreover, as the finger 20 moves further into the panel opening 12, the displacements of the rollers 14 and 16 continuously trace the horizontal and vertical thickness contours respectively of the finger 20 as a function of the length of the finger. These thickness contours of course widen to relative peaks at each of the knuckles of the finger 20.

Therefore, by continuously or repeatedly measuring the displacements of the rollers 14 and 16 as the finger is being inserted into the panel opening 12, one can obtain data on the finger thickness contours. Then, by suitable processing of that data, the relative peaks in the thickness contours which represent the knuckles can be located, and conclusions as to the thicknesses and locations of the knuckles can be drawn which are usable as criteria of personal identity.

In order to mount the finger support plate 18 for longitudinal movement, the rear portion thereof is captured between two upper rollers 30 and a lower roller 32 which are journaled on respective pins 34 so that they roll as the plate 18 moves longitudinally. The pins 34 in turn are supported between the vertical walls 36A of an upright channel member 36. The forward portion of the support plate 18 rests upon an upright post 40, which is connected to the wiper of a linear potentiometer 42 and moves therewith as the finger 20 is inserted into the panel opening 12. Consequently the resistance of potentiometer 42 varies as a function of finger insertion, to facilitate electrical measurement of finger displacement.

The upright channel member 36 is supported upon an inverted channel member 44, and the linear potentiometer 42 is affixed to the underside of the channel member. The channel member in turn is affixed to the panel 10. The linear potentiometer post 40 protrudes upwardly from the potentiometer 42 through a slit 44A formed in the channel member 44. A return spring 46 is secured at its rear end to the potentiometer post 40, and at its forward end to the panel 10 in any suitable manner (not illustrated), so as to bias the potentiometer post, and with it the finger support plate 18, forwardly (opposite to the direction indicated by arrow 22) to establish their initial positions before any finger measurements are taken.

Figure 2:
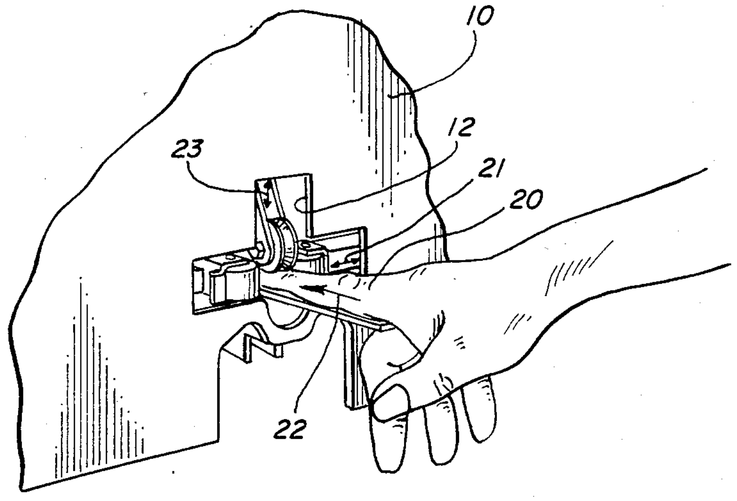
FIG. 2 is a similar view, showing the insertion of a finger into the device for measurement purposes.
Figure 7:
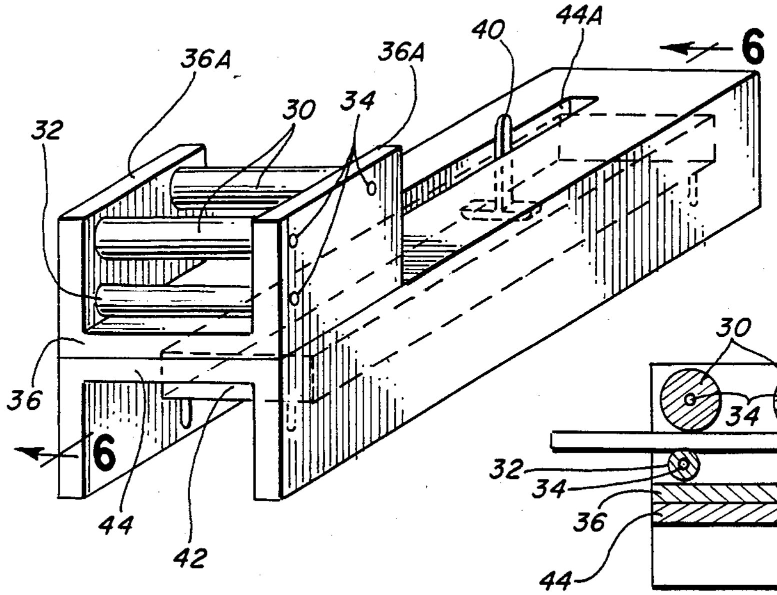
FIG. 7 is a partial rear perspective view of a portion of the finger measurement station of either embodiment.
Figure 6:
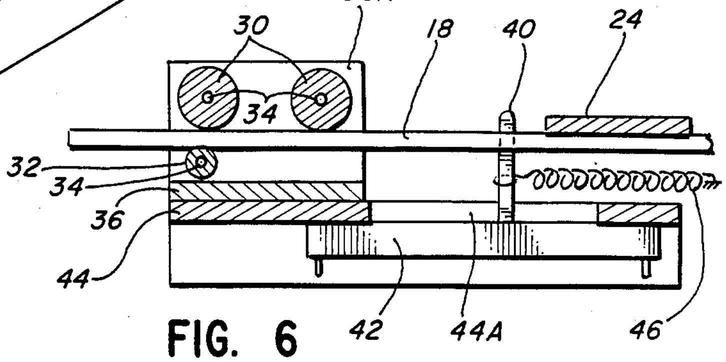
FIG. 6 is a fragmentary side elevational view of a portion of the finger measurement station of either embodiment.
Figure 3:
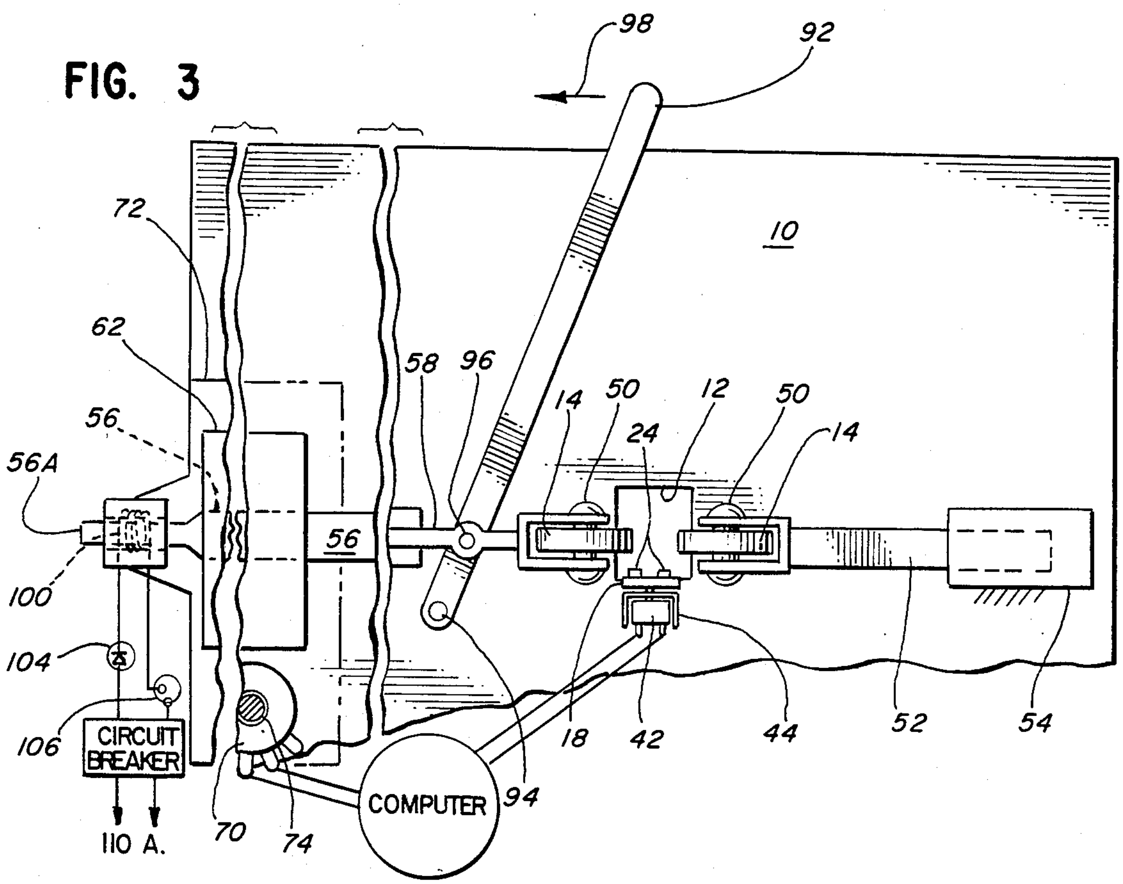
FIG. 3 is a partially schematic, partially rear elevational view of a somewhat different embodiment of a personal identification device in accordance with this invention.
Figure 4:
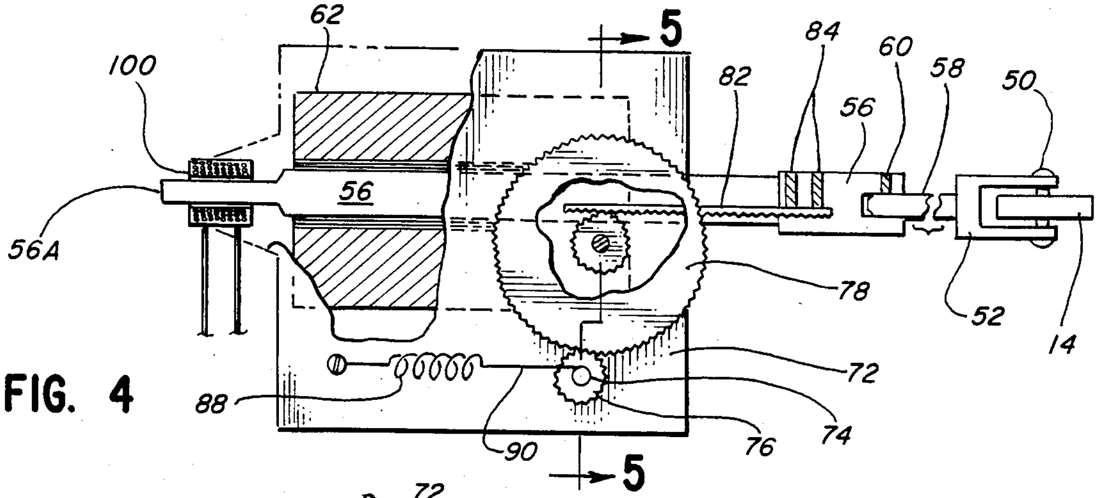
FIG. 4 is an enlarged rear elevational view, with parts broken away for clarity of illustration, of a portion of the device of FIG. 3.
Figure 5:
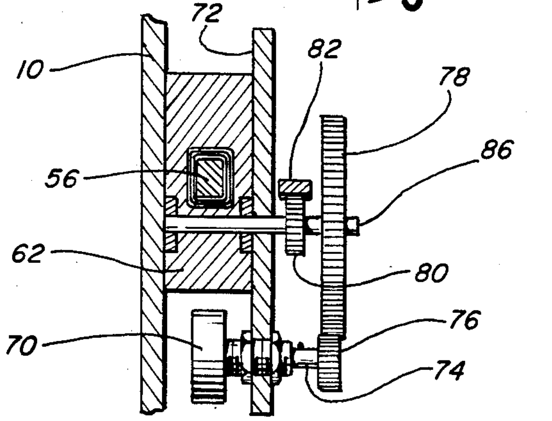
FIG. 5 is a sectional view taken along the lines 5—5 of FIG. 4.

The embodiment of FIGS. 3–5 is similar in all respects to that of FIGS. 1–2 and 6–7, except that the vertical measurement roller 16 is omitted, and the device depicted therein is suitable for use with a personal identification algorithm which employs only horizontal finger thickness measurements.

The horizontal measurement rollers 14 are journaled on respective shafts 50, which are captured between the tines of respective fork members 52. One of the fork members is fixedly secured to a mounting block 54, which in turn is affixed to the front plate 10. The other fork member 52, however, is secured to a slide member 56 by means of a post 58 which is received within a socket formed in one end of the slide member 56 and secured in place by a set screw 60. The other end of the slide member 56 is slideably received within an opening formed in a mounting block 62 which in turn is affixed to the front plate 10. This permits the slide member 56 and its associated fork member 52 and roller 14 to slide horizontally as a unit to accommodate the thickness of the finger 20 as the latter is inserted into the panel opening 12.

A rotary potentiometer 70 is secured to an auxiliary mounting plate 72, which is part of the frame of the personal identification device, and is mechanically coupled to the horizontal movement of the moveable roller 14 by means of the potentiometer shaft 74, a pair of gears 76 and 78, a pinion 80 and a rack 82. The rack is received within a socket formed in the slide member 56, and secured therein by set screws 84. As the roller 14 and slide member 56 move horizontally, the rack moves therewith, and thereby drives the pinion 80. The pinion and the gear 78 are both keyed to a common shaft 86 which is journaled on the mounting block 62. Consequently, the gear 78 rotates with the pinion, and thereby drives the gear 76 and the potentiometer shaft 74 which is secured thereto.

This arrangement causes the resistance of the potentiometer 70 to vary as a function of the horizontal displacement of the moveable roller 14, which in turn is a function of the horizontal width of the portion of the finger 20 which is passing between the rollers 14 at any particular moment. In this way, the illustrated apparatus derives an electrical output which varies continuously as a function of horizontal finger width.

If it is decided to include the vertical measurement roller 16 in this apparatus, as illustrated in FIGS. 1 and 2, a similar but vertically displaceable mechanism may be employed in conjunction with the vertical measurement roller in order to derive an electrical output which varies continuously as a function of vertical finger width.

The initial position of the moveable roller 14 prior to insertion of the finger 20 is established by a biasing spring 88 secured to a cable 90 which is wrapped around the potentiometer shaft 74. The tension in the spring 88 causes the shaft 74 to rotate in the direction to bias the moveable roller 14 toward the fixed roller 14.

When making a horizontal finger width measurement, a lever 92 may be conveniently used to retract the moveable roller 14 from its initial position, in order to facilitate initial insertion of the finger 20. The lever is fulcrumed by a pivot pin 94 secured to the front plate 10, and is pivotably secured to the fork member 52 by a pin 96. As the lever 92 is moved in the direction indicated by arrow 98, this connection causes the fork 52, slide member 56 and moveable roller 14 to be retracted so as to open up the jaws formed by the two rollers 14, permitting the finger 20 to be inserted easily therebetween.

Thereafter, the lever 92 may be released, allowing the biasing spring 88 to return the moveable roller 14 toward its initial position. This causes the moveable roller to come into contact with the finger 20, and thereafter, as the finger 20 is withdrawn from between the rollers 14 it causes the moveable roller to remain in contact with the finger to provide a continuous electrical measurement corresponding to the thickness contour of the finger.

In order to permit the moveable roller 14 to respond more accurately to the changes in thickness as the finger is withdrawn, magnetically induced dither is used to free the horizontal movement of the slide member 56 from frictional hang-up. A solenoid winding 100 is provided, through the center of which loosely protrudes an extension 56A of the slide member 56. The solenoid is energized, via a circuit breaker 102, by ordinary 60 Hz A.C., half-wave rectified by a diode 104. This causes the solenoid to vibrate the slide member 56 rapidly, and thereby prevent it from becoming frictionally locked by minute surface irregularities within the interior of the mounting block 62. A switch 106 is provided, however, to allow the operator of the apparatus to turn off the dither feature if desired.

A computer, preferably a microcomputer, schematically illustrated at 110, is connected to receive the electrical information concerning depth of finger insertion provided by the potentiometer 42, and also the electrical information regarding the finger thickness contour provided by the potentiometer 70, and it is suitably programmed to carry out a personal identification algorithm using this information as raw data. In successful tests of this invention, for example, an Apple II personal computer, programmed in Basic, was used, and the potentiometers were connected to the computer's paddle control inputs.

The first step in the personal identification procedure is to do a finger measurement on a selected test finger (e.g. the index or middle finger) of a known person, and store the data relating to that person on a magnetic disk. Subsequently, when an unknown person claims to be the known person, a second identical finger measurement is performed upon the test finger of the unknown person, the data relating to the known and unknown persons are compared, and a computer-assisted decision is made, based on some suitable decision algorithm, as to whether the data are sufficiently similar to justify treating the unknown person as the known person, e.g. by honoring that individual's credit card for the purchase of merchandise.

One decision algorithm which has been used with success in tests of this invention employs the well known least square regression analysis to fit one or more parabolic curves to the measured finger thickness contours, and the dimensions of the parabolas thus obtained are used as refined data on which to base the comparison between the known and unknown persons. If an arbitrarily selected number of measurements of the known and unknown persons are within an arbitrarily selected numerical distance of each other, then that is taken as an indication of personal identity. If those criteria are not met, then that is taken as an indication of non-identity.

The choices of these arbitrary criteria depend entirely upon the desired trade-off between the degree of security required and the number of false negatives which can be tolerated. This will depend on the circumstances (e.g. the amount of money at stake) and the personal judgment of the individual charged with designing the system.

The minimum amount of information required for operation of the invention is a comparison between either the horizontal or vertical thicknesses of one selected knuckle on one test finger of the known and unknown persons. Alternatively, more accurate determinations can be made by comparing the horizontal or vertical thicknesses of two selected knuckles on one or more test fingers of the known and unknown persons. Another way of increasing the accuracy is to include a comparison of both the vertical and horizontal thickness measurements of at least one knuckle of both persons, employing both the horizontal measurement rollers 14 and the vertical measurement roller 16 discussed above.

The preferred method, however, is to compare the thickness of at least two knuckles of one finger plus the distance between those two knuckles. As the test finger is withdrawn the potentiometer which is coupled to the thickness measurement roller presents to the computer a smoothly varying electrical resistance curve representing the thickness contour of the finger, and the potentiometer which is coupled to the finger support plate presents to the computer a continuous electrical resistance ramp which representing the changing degree of finger insertion. By plotting one value against the other, the computer obtains information about the variation of the thickness of the finger along its length. The peak values of the thickness contour represent the two knuckles of the finger, and the separation between the peaks represents the distance between those knuckles.

The computer is programmed to sample the potentiometer resistance at frequent intervals during finger withdrawal, thereby collecting a series of raw data point pairs (length and thickness). The program then processes this raw data to find the two peak values representing the knuckles of the test finger. But instead of using the raw peak values, the program preferably calculates a refined peak for each knuckle by taking a selected number of finger width values (e.g. ten of them) which are closest in magnitude to each raw peak, and averaging them together to reduce measurement errors. This average value is then used as the peak thickness for each knuckle, and serves as the reference point about which to fit a smooth curve which best fits the raw data points.

Successful results have been obtained employing a parabolic curve fitted by the method of least squares, using in the regression formula about twenty-five data points on each side of the average peak. (For details of the regression formula, see e.g. Sec. 5.6 of "Advanced Engineering Mathematics" by C. R. Wylie, Jr., published by McGraw-Hill.) This parabola is then compared to the raw data points, and all data points which are more than a selected distance from the parabola peak are arbitrarily discarded, on the assumption that they are on a non-parabolic portion of the finger. The curve-fitting process is then repeated, using the remaining data points, to obtain a second, more accurate parabola which passes through the selected set of points with minimum least square error, thus conforming optimally to the retained data points. The magnitude and longitudinal location of the peak of this second parabola is calculated from the resulting equation; and is taken as the thickness and position respectively of the knuckle.

The end result of the described data processing is two parabolas, one for each of the two knuckles of the test finger, which give the locations of those knuckles along the longitudinal axis of finger. A straightforward subtraction of one location value from the other then gives the distance between the knuckles. The knuckle thickness values for the two knuckles similarly may be determined simply by examining the peak values of the two parabolas. These values are then stored on disk.

Subsequently, when an unknown person is presented for identification, the same measurements are repeated on the same joints of the unknown person, and the same calculations are performed by the computer. The newly acquired knuckle thickness and knuckle separation values are then compared to the corresponding stored values by a straightforward subtraction process to determine the respective absolute values of the differences between the two knuckle thicknesses and the knuckle separations, of the known and unknown persons. If these three absolute values meet an arbitrarily determined criterion, the computer is programmed to reject the unknown person; otherwise the identity of the two individuals is accepted.

Alternatively, each calculated parabola may be reduced to the standard equation form $y=ax^2+bx+c$, and the coefficients a, b and c for both the known and the unknown persons are compared to determine the degree of similarity between them.

One possible source of inaccuracy which inheres in the system, regardless of the number or type of measurements employed, is the fact that the thickness of the finger joints of the same individual may vary over a short term such as the course of a single day, depending upon circadian physiological rhythms. In order to cope with this difficulty, two joints of the same finger, or preferably two corresponding joints of separate fingers (e.g. the index and middle fingers), can be measured on both the known and the unknown individuals. Two joints of one finger are then treated as test joints, and the corresponding joints of the other finger are treated as reference joints and used to correct for short-term variations in joint thickness.

The test joint and the reference joint thicknesses of the known person are both measured, processed as described above, and stored. Then the same procedure is performed on the unknown person. But before the results relating to the test joints of the two persons are compared, the reference joint measurements of the two persons are first compared and the difference between the two, if any, is determined by subtraction. This difference is then assumed to be a measurement of the short-term changes in joint thickness, and is algebraically added to the test joint measurement of either the known or the unknown person (i.e. added to or subtracted from it, depending on whether the difference is positive or negative) to correct for the assumed short-term changes. Then it is this corrected test joint measurement which is compared to the test joint measurement for the other person. This procedure is part of the comparison algorithm employed by the computer.

It is believed that the impact of short-term daily changes is further reduced by performing all measurements on the non-dominant hand, i.e. the left hand of a right-handed person and vice versa.

Another possible source of inaccuracy is long-term changes which take place over the lifetime of the known person as a result of aging. This problem can be dealt with by making periodic corrections of the stored measurements each time the known person successfully re-enters the system for measurement. Thus, each time a request for validation is answered in the affirmative, despite the presence of small discrepancies in the measurements which are within the limits of acceptability, some selected fraction (e.g. one fifth) of the difference is algebraically added to the previously stored measurements of the known person to produce a new permanently stored value which is assumed to reflect a long-term trend resulting from changes in the known person's physical characteristics as a result of increasing age.

Of course if the unknown person is rejected because the differences are outside the limits of acceptability, when such differences are assumed to be due to different identities rather than to the aging of a single individual, and therefore no correction for long-term changes is made.

Note that it is only the long-term correction which is incorporated into the permanently stored data base, and not the short-term circadian correction. The long-term aging changes are permanent, but the short-term daily variation is temporary.

A variety of choices of test joints and reference joints for short-term and long-term change compensation is possible. The preferred system is to use the thicknesses of the two knuckles of the index finger, and the distance between those knuckles, as the test measurements; and the corresponding dimensions of the middle finger of the same hand as the reference dimensions which correct for short- and long-term variations.

A specific example of the use of these techniques will now be given. In a preferred embodiment of the invention, a credit card holder first appears at a central station or at a local store which is equipped with apparatus of the type described above for measurement by the apparatus, at which time six raw values are measured, i.e. three different values on each of two fingers. The three values are the thickness of the first and second knuckle joints of the finger in question, and the distance (or separation) between those joints. The fingers employed are the index finger and the middle finger of the credit card holder's non-dominant hand. These measurements are sent by telephone to the central computer, and stored in the computer's data base.

When the credit card holder, or someone claiming to be the credit card holder, presents the credit card at one of the participating retail stores after having his measurements added to the central computer's data base, the same six raw measurements are taken again. The credit card number and the six measured values are sent over telephone lines to the central computer for both credit checking and identification, the latter operation being based upon a comparison between the new data and the stored data.

The computer first processes the raw data as described above, then uses the processed data to calculate the differences between the *reference* finger joint thicknesses of the known person and the unknown person, for each of the two knuckles of that finger, and then algebraically adds those differences to the corresponding finger joint thicknesses measured upon the unknown person's *test* finger. The resulting corrected test finger joint thicknesses of the unknown person are then compared to the respective corresponding stored test finger joint thickness measurements. This comparison is carried out by subtracting the final test finger joint thickness value of one person from the corresponding final test finger joint thickness value of the other person for each of the two test finger joints.

In addition, the computer subtracts the test finger joint separation value and reference finger joint separation value of one person from the corresponding finger joint separation values of the other person. These calculations thus produce four separate error values; one for each of the two test finger joint thicknesses, and one for each of the two finger joint separations. These four error values are then employed in the following decision algorithm to determine whether the combined error values are within acceptable limits for extending credit.

An arbitrary, pure numerical constant K is used as a figure of merit, and is initially set equal to zero. This figure of merit is then incremented or decremented according to the results of the comparisons between the processed finger measurements. For this procedure the computer uses an arbitrary unit of length equal to 0.184 millimeters. According to the decision algorithm, if the absolute value of the error for the joint separation value for the middle finger exceeds 4 units (0.736 millimeters), the computer subtracts 1 from K; whereas if the absolute value of that error is less than 2.1 units (0.386 mm), then the computer adds 1 to K.

If the absolute value of the error for the joint separation for the index finger is less than 2.1 units (0.386 mm), then 1 is added to K; but if it exceeds 4 units (0.736 mm), then 1 is subtracted from K.

If the absolute value of the error for the first test finger joint thickness is less than 5.1 units (0.24 mm), then 1 is added to K; and the same is done with respect to the absolute value of the error for the second test finger joint thickness.

If the resulting integral value of K is greater than 1, i.e., if it is at least 2, then credit is extended; but if it is less than 2, credit is denied. While this decision algorithm has worked well in small scale tests, it has the advantage of being "tunable" if further experience indicates that the figure of merit K should be incremented or decremented by different amounts or under different error conditions.

For the purposes of further exemplification, this description concludes with the following appendix consisting of a program flow chart of a personal identification algorithm in accordance with the invention, and a corresponding Basic computer program listing, followed by a table of definitions of symbols used in the listing and a description of the program operation:

APPENDIX

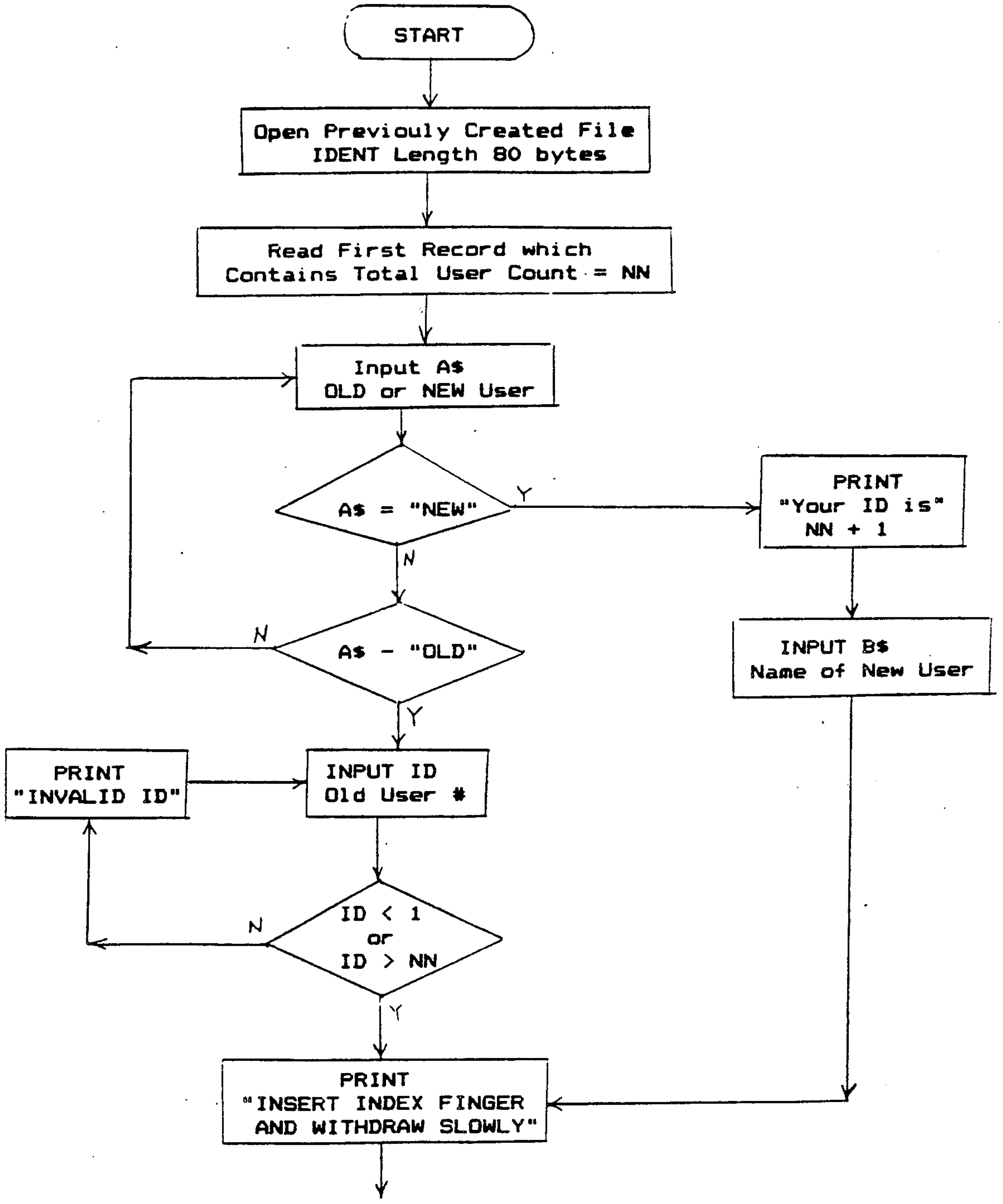

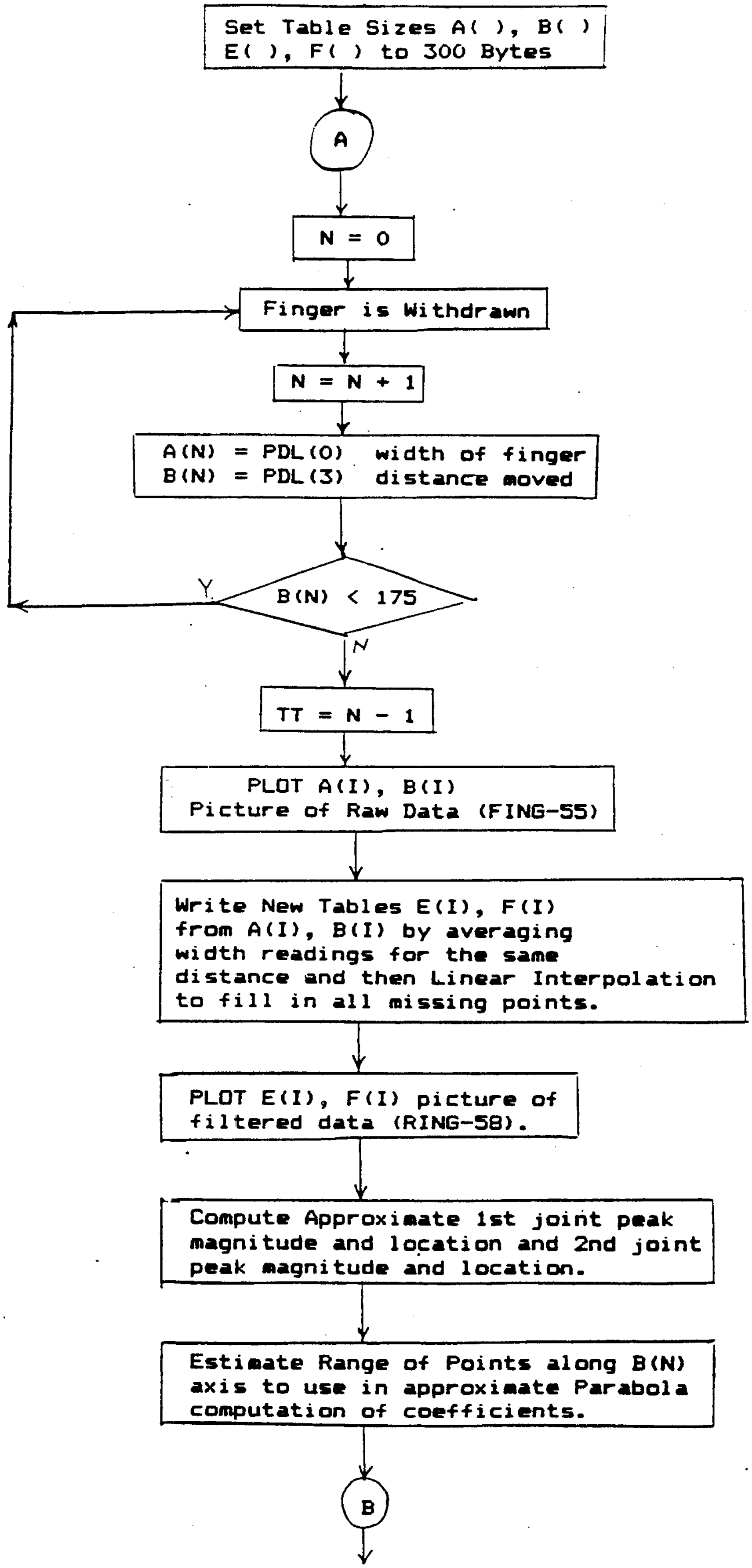
Set Table Sizes A( ), B( )
E( ), F( ) to 300 Bytes
A
N = 0
Finger is Withdrawn
N = N + 1
A(N) = PDL(0) width of finger
B(N) = PDL(3) distance moved
Y
B(N) < 175
N
TT = N - 1
PLOT A(I), B(I)
Picture of Raw Data (FING-55)
Write New Tables E(I), F(I)
from A(I), B(I) by averaging
width readings for the same
distance and then Linear Interpolation
to fill in all missing points.
PLOT E(I), F(I) picture of
filtered data (RING-58).
Compute Approximate 1st joint peak
magnitude and location and 2nd joint
peak magnitude and location.
Estimate Range of Points along B(N)
axis to use in approximate Parabola
computation of coefficients.
B

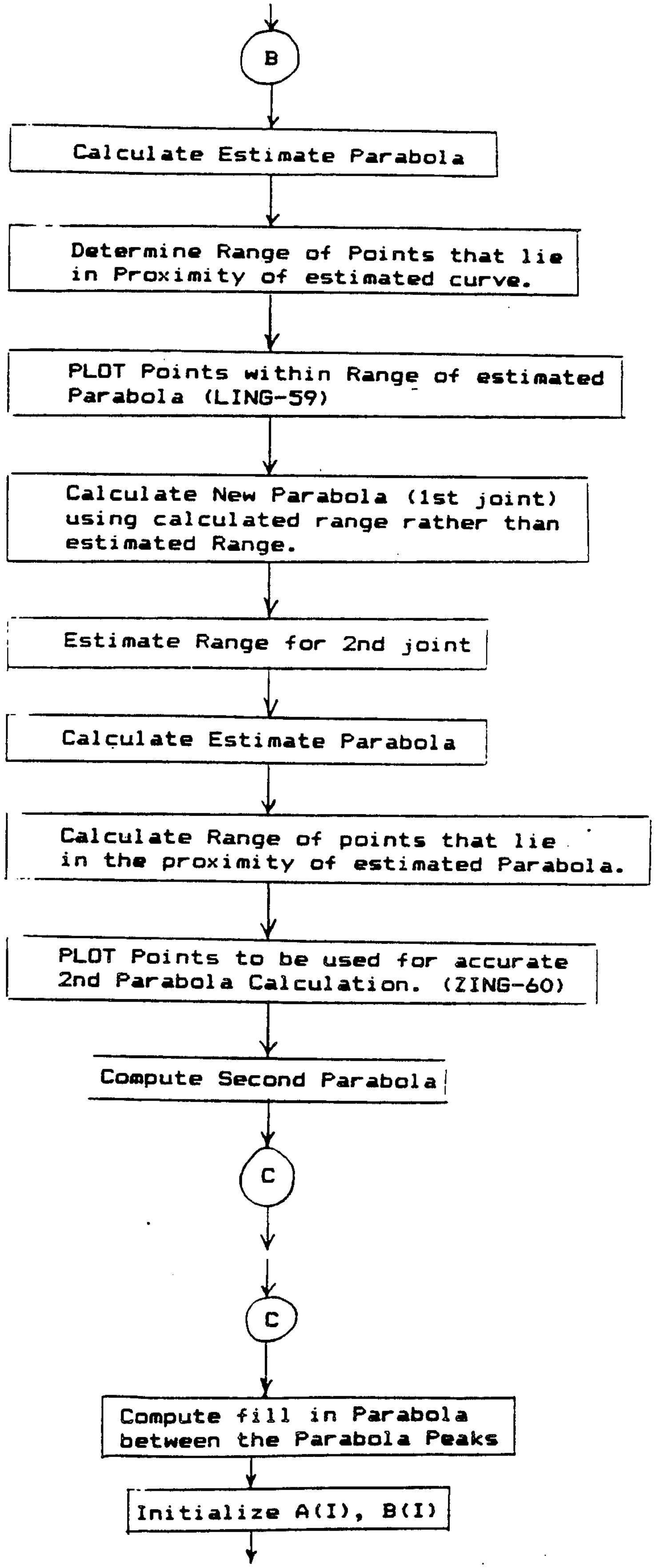
B
Calculate Estimate Parabola
Determine Range of Points that lie in Proximity of estimated curve.
PLOT Points within Range of estimated Parabola (LING-59)
Calculate New Parabola (1st joint) using calculated range rather than estimated Range.
Estimate Range for 2nd joint
Calculate Estimate Parabola
Calculate Range of points that lie in the proximity of estimated Parabola.
PLOT Points to be used for accurate 2nd Parabola Calculation. (ZING-60)
Compute Second Parabola
C
C
Compute fill in Parabola between the Parabola Peaks
Initialize A(I), B(I)

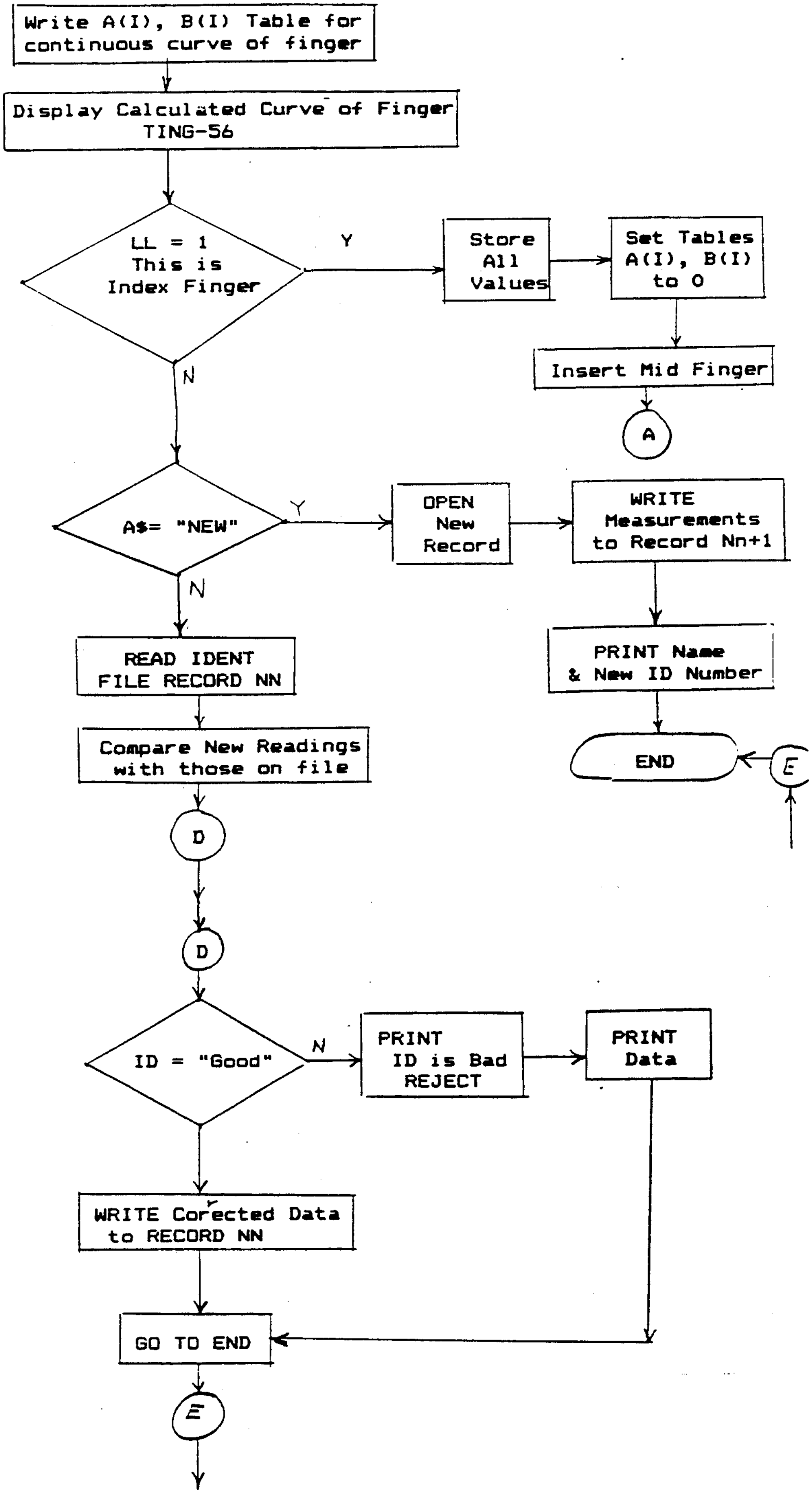
Write A(I), B(I) Table for continuous curve of finger
Display Calculated Curve of Finger TING-56
LL = 1 This is Index Finger
Y
Store All Values
Set Tables A(I), B(I) to 0
N
Insert Mid Finger
A
A$= "NEW"
Y
OPEN New Record
WRITE Measurements to Record Nn+1
N
READ IDENT FILE RECORD NN
PRINT Name & New ID Number
Compare New Readings with those on file
END
E
D
D
ID = "Good"
N
PRINT ID is Bad REJECT
PRINT Data
WRITE Corected Data to RECORD NN
GO TO END
E

```
]LIST

1  REM  FINGER ID SYSTEM
2  REM  WRITTEN BY EDWARD FRIELING
4  REM   REVISED FEB. 11, 1985
5  CLEAR
6 LL = 0
10 D$ =  CHR$ (4)
15  PRINT D$;"OPEN IDENT,L80"
20  PRINT D$;"READ IDENT,R1"
25  INPUT NN
26  PRINT D$;"CLOSE IDENT"
30  PRINT "IF NEW USER TYPE NEW"
35  PRINT "IF OLD USER TYPE OLD"
40  INPUT A$
45  IF A$ = "NEW" THEN  GOSUB 9000
50  IF A$ = "OLD" THEN  GOSUB 10000
52  IF A$ <  > "NEW" AND A$ <  > "OLD" THEN  GOTO 30
55  PRINT "INSERT INDEX FINGER"
56  PRINT "TURN ON DITHER POWER"
57  PRINT "REMOVE FINGER SLOWLY AFTER PRESSING RETURN"
60  INPUT PAUSE$
65  GOTO 100
70  GOSUB 11000
71  GOSUB 1400
75  PRINT "INSERT MIDDLE FINGER"
76  PRINT "TURN ON DITHER POWER"
77  PRINT "REMOVE FINGER SLOWLY AFTER PRESSING RETURN"
80  INPUT PAUSE$
85  GOTO 105
87  IF M = 1 THEN  GOSUB 12000
90  IF M = 0 THEN  GOSUB 13000
91  IF A$ = "NEW" THEN  PRINT "ID IS "NN + 1" FOR "B$
95  END
100  GOSUB 300
105  GOSUB 400
110  GOSUB 3000
111  REM
115 FP = 1
120 LP = TT
122  GOSUB 5000
123 FP = 5
124 LP = BMAX - 5
125  GOSUB 500
126 R =  INT ( SQR (YN / .09))
127  IF R > (XN - 2) THEN R = XN - 2
128 FP = XN - R
129 LP = XN + R
130  GOSUB 1000 .
135 FP = 5
140 LP = BMAX - 5
145  GOSUB 2000
146 FP = M1 + 5
147 LP =  INT (S1 - 6) + 1
150  GOSUB 3500
165  GOSUB 1000
170  REM
174 B0 = A0:B1 = A1:B2 = A2
180 L =  INT ( SQR (EN / .09))
182  IF L > (BN - 2) THEN L = BN - 2
187 LP = BN + L
188 FP = BN - L
190  GOSUB 1000
191  REM
195 FP = 1
200 LP = BMAX - 5
```

```
210 M2 = M1
215 S2 = S1
220  GOSUB 2000
225 FP = M1 + 3
230 LP = S1 - 5
233  GOSUB 3600
235  GOSUB 1000
240 FP = S2 - 15
245 LP = M1 + 15
250 C0 = A0:C1 = A1:C2 = A2
251 LL = LL + 1
255  GOSUB 1000
257  GOSUB 4000
259  GOSUB 8000
260  IF LL = 1 THEN  GOTO 70
261                  GOTO 87
300  DIM A(300)
330  DIM B(300)
331  DIM E(300)
332  DIM F(300)
399  RETURN
400 N = 0
405 N = N + 1
410 A(N) =  PDL  (0)
420 B(N) =  PDL  (3)
430  IF B(N) < 175 GOTO 405
435 TT = N - 1
450  RETURN
500 DY = 250:YN = 0:EN = 0
510  FOR I = FP TO LP
520  IF E(I) > YN - 1 THEN XN = F(I):YN = E(I)
530  NEXT I
540  GOSUB 700
545 K = 0
550  FOR I = XN + 10 TO LP
560  IF K > 5 THEN  GOTO 590
570  IF E(I) < DY THEN DY = E(I):DX = F(I): GOTO 590
580  IF E(I) > E(I - 5) THEN K = K + 1
590  NEXT I
600  FOR I = DX TO LP
610  IF E(I) > EN - 1 THEN EN = E(I):BN = F(I)
620  NEXT I
630  GOSUB 800
640  RETURN
700 TZ = 2
701 Q = 25
705  IF XN < 27 THEN Q = XN - 2
710 XP = 0
720 K = 0:XQ = 0
730  FOR I = (XN - Q) TO (XN + Q)
740  IF E(I) > (E(XN) - TZ) THEN XP = XP + F(I):K = K + 1:XQ = XQ + E(I)
750  NEXT I
760  IF K < 10 THEN TZ = TZ + 1: GOTO 710
770 XN =  INT (XP / K + .5)
780 YN =  INT (XQ / K + .5)
790  RETURN
800 TZ = 2
801 Q = 25
810 XP = 0
820 K = 0:XQ = 0
830  FOR I = (BN - Q) TO (BN + Q)
840  IF E(I) > (E(BN) - TZ) THEN XP = XP + F(I):K = K + 1:XQ = XQ + E(I)
850  NEXT I
860  IF K < 10 THEN TZ = TZ + 1: GOTO 810
870 BN =  INT (XP / K + .5)
880 EN =  INT (XQ / K + .5)
```

```
890  RETURN
1000 SX = 0:SY = 0:XY = 0:XX = 0:YY = 0:X3 = 0:X4 = 0:ZY = 0
1005 N = 0
1020  FOR I = FP TO LP
1024 X = F(I)
1025  IF X < 5 THEN  GOTO 1100
1026 Y = E(I)
1030 SX = SX + X
1040 SY = SY + Y
1050 XY = XY + X * Y
1060 XX = XX + X * X
1070 X3 = X3 + X * X * X
1080 X4 = X4 + X * X * X * X
1090 YY = YY + Y * Y
1095 ZY = ZY + X * X * Y
1096 N = N + 1
1100  NEXT I
1110 EA = XX - ((SX * SX) / N)
1115  IF EA = 0 THEN EA = 10000
1120 EB = YY - ((SY * SY) / N)
1130 EC = XY - ((SX * SY) / N)
1140 ED = EC / EA
1150 XM = SX / N
1160 YM = SY / N
1170 P1 = SX * XX / N
1180 P2 = X3 - P1
1190 TP = ((ZY - ((SY * XX) / N)) / P2) - ED
1200 BOT = ((X4 - ((XX * XX) / N)) / P2) - (P2 / EA)
1210 A2 = TP / BOT
1220 A1 = (EC - A2 * (X3 - P1)) / EA
1230 A0 = YM - (A1 * XM) - (A2 * (XX / N))
1270  RETURN
1400  FOR I = 1 TO 300
1410 A(I) = 0:B(I) = 0:E(I) = 0:F(I) = 0: NEXT I
1440  RETURN
2000 K = 0
2010  FOR I = FP TO LP
2020 X = F(I)
2030 Y = E(I)
2050 DD = A2 * X * X + A1 * X + A0
2070  IF F(I) > 5 AND  ABS (DD - Y) < 4 THEN K = K + 1:S1 = F(I)
2080  IF K = 1 THEN M1 = F(I)
2090  NEXT I
2100  RETURN
3000  HGR2
3010  HCOLOR= 7
3020  FOR I = 1 TO TT: HPLOT A(I),B(I)
3025  NEXT I
3060  RETURN
3500  HGR2
3510  HCOLOR= 7
3520  FOR I = FP TO LP
3535  HPLOT E(I),F(I)
3540  NEXT I
3541  FOR I = 1 TO 300:A(I) = 0:B(I) = 0: NEXT I
3590  RETURN
3600  HGR2
3610  HCOLOR= 7
3620  FOR I = FP TO LP
3635  HPLOT E(I),F(I)
3640  NEXT I
3690  RETURN
4000 K = 250
4005  GOSUB 7000
4010  FOR X = 1 TO S9:Y = B2 * X * X + B1 * X + B0
4030  IF Y < K THEN A(X) = X:B(X) =  INT (Y + .5)
```

```
4040  NEXT X
4041 K5 = YN
4045  GOSUB 7500
4050  FOR X = S9 + 1 TO S8
4060 Y = A2 * X * X + A1 * X + A0
4070  IF Y < K THEN A(X) = X:B(X) =  INT (Y + .5)
4080  NEXT X
4090  FOR X = S8 + 1 TO 190
4100 Y = C2 * X * X + C1 * X + C0
4110  IF Y < K THEN A(X) = X:B(X) =  INT (Y + .5)
4120  NEXT X
4130  HGR2
4140  HCOLOR= 7
4150  FOR I = 1 TO 190
4160  IF A(I) > 0 AND A(I) < 190 AND B(I) > 0 AND B(I) < 250 THEN  HPLOT
     B(I),A(I)
4170  NEXT I
4524  RETURN
5000 BMAX = 0
5005 S5 = 0
5010  FOR I = FP TO LP
5015  IF B(I) > 0 THEN S5 = 1
5020  IF B(I) = 0 AND S5 = 0 THEN T = T + 1: GOTO 5080
5040  IF (B(I) = B(I - 1) AND B(I) <  > B(I + 1)) THEN E(B(I - 1)) =  INT
     ((A(I - 1) + A(I)) / 2): GOTO 5080
5042  IF (B(I) = B(I - 1) AND B(I) = B(I + 1) AND B(I) <  > B(I + 2)) THEN
     E(B(I - 1)) =  INT ((A(I - 1) + A(I) + A(I + 1)) / 3 + .5): GOTO 508
     0
5044  IF (B(I) = B(I - 1) AND B(I) = B(I + 1) AND B(I) = B(I + 2)) THEN E
     (B(I - 1)) =  INT ((A(I - 1) + A(I) + A(I + 1) + A(I + 2)) / 4 + .5)
     : GOTO 5080
5050 E(B(I)) = A(I)
5060 F(B(I)) = B(I)
5070  IF B(I) > BMAX THEN BMAX = B(I)
5080  NEXT I
5090  FOR I = 1 TO BMAX - 4
5100  IF F(I) = 0 THEN  GOSUB 6000
5200  NEXT I
5810  HGR2
5820  HCOLOR= 7
5830  FOR I = 1 TO BMAX
5840  HPLOT E(I),F(I)
5850  NEXT I
5900  RETURN
6000 R = 1
6010 K = 1
6020  IF F(I + R) = 0 THEN R = R + 1: GOTO 6020
6030  FOR J = I TO I + R - 1
6040 F(J) = J
6050 E(J) =  INT (K * ((E(J + R - K + 1) - E(J - K)) / (R + 1)) + E(J - K
     ) + .5)
6060 K = K + 1
6070  NEXT J
6080  RETURN
7000 B = (B1 - A1) / (B2 - A2)
7010 C = (B0 - A0) / (B2 - A2)
7015  IF (B * B - 4 * C) < 0 THEN S9 = S2 + 10: GOTO 7060
7020 X1 = ( - B +  SQR (B * B - 4 * C)) / 2
7030 X2 = ( - B -  SQR (B * B - 4 * C)) / 2
7040  IF X1 > X2 THEN S9 =  INT (X1 + .5): GOTO 7060
7050 S9 =  INT (X2 + .5)
7060  RETURN
7500 B = (C1 - A1) / (C2 - A2)
7510 C = (C0 - A0) / (C2 - A2)
7515  IF (B * B - 4 * C) < 0 THEN S8 = M1 + 5: GOTO 7560
7520 X1 = ( - B +  SQR (B * B - 4 * C)) / 2
7530 X2 = ( - B -  SQR (B * B - 4 * C)) / 2
```

```
7540  IF X1 < X2 THEN S8 =  INT (X1 + .5): GOTO 7560
7550 S8 =  INT (X2 + .5)
7560  RETURN
8000 X1 =  - (C1 / (2 * C2))
8010 XO =  - (B1 / (2 * B2))
8020 Y1 = C2 * X1 * X1 + C1 * X1 + CO
8030 YO = B2 * XO * XO + B1 * XO + BO
8035 LE = X1 - XO
8040 DE = YO - Y1
8042 K6 = EN
8043 K7 = BN - XN
8045 K2 =  ABS ( INT (Y1 + .5))
8050  TEXT
8051 KO =  ABS ( INT (LE + .5))
8052 K1 =  ABS ( INT (YO + .5))
8053 K4 =  ABS ( INT (1000 * C2 + .5))
8054 K3 =  ABS ( INT (1000 * B2 + .5))
8055  PRINT "DISTANCE ----------"KO
8056  PRINT "THICKNESS #1 ------"K1
8057  PRINT "THICKNESS #2 ------"K2
8058  PRINT "SHAPE #1 ----------"K3
8059  PRINT "SHAPE #2 ----------"K4
8060  PRINT "DATA THICKNESS #1 -"K5
8062  PRINT "DATA THICKNESS #2 -"K6
8066  PRINT "DATA DISTANCE -----"K7
8070  RETURN
9000  PRINT "YOUR ID NUMBER IS "NN + 1
9005  PRINT "PLEASE WRITE IT DOWN"
9010  PRINT "ENTER LAST NAME SPACE FIRST NAME WITH UP TO 20 CHARACTERS"
9020  INPUT B$
9030 M = 1
9040  RETURN
10000  PRINT "ENTER ID NUMBER"
10010  INPUT ID
10020  IF ID < 1 OR ID > NN THEN  PRINT "INVALID ID": GOTO 10000
10070  RETURN
11000 WO = KO
11005 W1 = K1
11010 W2 = K2
11020 W3 = K3
11030 W4 = K4
11040 W5 = K5
11050 W6 = K6
11060 W7 = K7
11070  RETURN
12000  PRINT D$;"OPEN IDENT,L80"
12005  PRINT D$;"WRITE IDENT,R1"
12006  PRINT NN + 1
12010  PRINT D$;"WRITE IDENT,R";NN + 1
12020  PRINT NN + 1: PRINT B$: PRINT WO: PRINT W1
12022  PRINT W2: PRINT W3: PRINT W4
12025  PRINT W5: PRINT W6: PRINT W7: PRINT KO
12027  PRINT K1: PRINT K2: PRINT K3
12030  PRINT D$;"CLOSE IDENT"
12040  RETURN
13000 K = 0
13005  PRINT D$;"OPEN IDENT,L80"
13010  PRINT D$;"READ IDENT,R";ID
13020  INPUT ID,B$,ZO,Z1,Z2,Z3,Z4,Z5,Z6,Z7,YO,Y1,Y2,Y3
13021  PRINT D$;"CLOSE IDENT"
13022  PRINT "INDEX LENGTH ERROR= "ZO - WO
13023  PRINT "MID LENGTH ERROR=   "YO - KO
13024 ER = Z1 - W1 - Y1 + K1
13025  PRINT "INDEX JOINT#1 ERROR="ER
13026 EER = Z2 - W2 - Y2 + K2
13027  PRINT "INDEX JOINT#2 ERROR="EER
```

```
13028 IF  ABS (YO - KO) > 4 THEN K = K - 1
13029 IF  ABS (ZO - WO) < 2.1 THEN K = K + 1
13030 IF  ABS (YO - KO) < 2.1 THEN K = K + 1
13031 IF  ABS (ER) < 5.1 THEN K = K + 1
13032 IF  ABS (EER) < 5.1 THEN K = K + 1
13033 IF  ABS (ZO - WO) > 4 THEN K = K - 1
13034 IF K > 1 THEN  GOTO 14000
13035 PRINT "ID IS BAD, RECHECK OR REJECT"
13036 PRINT "LEN#1 = "ZO - WO
13037 PRINT "LEN#2 = "YO - KO
13038 PRINT "THICKNESS #1 ERROR ="ER
13039 PRINT "THICKNESS #2 ERROR ="EER
13050 RETURN
14000 PRINT "THIS IS "B$
14010 PRINT D$;"OPEN IDENT,L80"
14020 PRINT D$;"WRITE IDENT,R";ID
14025 PRINT ID: PRINT B$
14030 PRINT  INT ((4 * ZO + WO) / 5 + .5)
14040 PRINT  INT ((4 * Z1 + W1) / 5 + .5)
14050 PRINT  INT ((4 * Z2 + W2) / 5 + .5)
14060 PRINT  INT ((4 * Z3 + W3) / 5 + .5)
14070 PRINT  INT ((4 * Z4 + W4) / 5 + .5)
14080 PRINT  INT ((4 * Z5 + W5) / 5 + .5)
14090 PRINT  INT ((4 * Z6 + W6) / 5 + .5)
14100 PRINT  INT ((4 * Z7 + W7) / 5 + .5)
14110 PRINT  INT ((4 * YO + KO) / 5 + .5)
14120 PRINT  INT ((4 * Y1 + K1) / 5 + .5)
14130 PRINT  INT ((4 * Y2 + K2) / 5 + .5)
14140 PRINT  INT ((4 * Y3 + K3) / 5 + .5)
15000 GOTO 13050
```

DEFINITION OF SYMBOLS USE IN FINGER PROGRAM
and the Lines of Code where they appear

A( ) Raw data table for finger width and final curve.
174,250,410,1230,1410,2050,3020,3541,4060,4160,5040,5042,5044,5050

A0 Constant term in Regression Analysis Formula.
174,250,1230,2050,4060,7010,7510

A1 Coefficient of X term in Regression formula.
174,250,1230,2050,4060,4160,7000,7500

A2 Coefficient of X square term in Regression formula
174,250,1210,1220,1230,2050,4060,7000,7010,7500,7510

A$ Holds word "OLD" or "NEW".
40,45,50,52,91

B Used to calcualte the intersection of parabolas.
7000,7015,7020,7030,7500,7515,7520,7530

B( ) Raw Data table for distance along finger.
330,420,430,1410,3020,4070,4110,4160,5020,5042,5060,5070

B0 Constant term of first parabola (joint nearest wrist)
174,4010,7010,8030

B1 Coef. of X term in first parabola.
174,3541,4010,7000,8010.8030

B2 Coef. of X square term in first parabola.
174,4010,7000,8010,8030,8054

BMAX Filtered data point count.
124,140,200,5000,5070,5090,5830

BN First joint peak location as calculated from data.
82,187,188,610,830,840,870,8043

B( ) Same as A( ) except for distance along finger.
420,430,4030,4160,5015,5040,5044

BOT Use in Regression formula.
1200,1210

C Used to calculate intersection of parabolas.
7010,7015,7020,7030,7510,7515,7520,7530

CO Constant term of second parabola (nearest wrist).
250,4100,7510,8020

CHR$ Control character to enter Disc System.
10

C1 Coef. of X term of second parabola.
250,4100,7500,8000,8020

C2 Coef. of X square term of second parabola.
250,4100,7500,8000,8020,8053

DD The independent variable of parabola used to set the range of useable data for a particular ssection of the curve.
2050,2070

DE Difference between thicknesses of joints from parabolas fitted to data points.
8040

DIM A(300) Dimension table "A" for 300 numbers.
300

DIM B(300) Dimension table "B" for 300 numbers.
330

DIM E(300) Dimension table "E" for 300 numbers.
331

DIM F(300) Dimension table "F" for 300 numbers.
332

DX Location of minimum between peaks.
570,600

DY Magnitude of minimum between peaks.
500,570

D$ Used to define Disc Instructions.
10,15,20,26,12000,12005,12010,12030,13005,13010,13021,14010,14020

E( ) Table of filtered data for finger width (ordinate).
520,570,580,610,740,840,1026,1410,2030,3535,3635,5040,5042,5044,5050,5840,6050

EA Used in Regression Calc.
1110,1115,1140,1220

EB Used in Regression Calc.
1120

EC Used in Regression Calc.
1130,1140,1220

| | |
|---|---|
| ED | Used in Regression Calc.<br>1140,1190 |
| EER | Error value.<br>13026,13027,13039 |
| EN | Thickness of second joint<br>180,500,610,880,8042 |
| ER | Error value.<br>13024,13025,13031,13032,13038 |
| F( ) | Table of filtered data along length of finger.<br>520,570,610,740,840,1024,1410,2020,2070,2080,3535,<br>3635,5060,5100,5840,6020,6040 |
| FP | First point<br>115,123,128,135,146,188,195,225,240,510,1020,2010,<br>3520,3620,5010 |
| HCOLOR | Sets color of screen.<br>3010,3510,3610,4140,5820 |
| HGR2 | Sets high resolution graphics mode.<br>3000,3500,3600,4130,5810 |
| HPLOT | Plot data in high resolution graphics.<br>3020,3535,3636,4160,5840 |
| I | Index for tables<br>510,520,530,550,580,590,600,620,730,750,830,850,<br>1020,1100,14001410,2010,2090,3020,3025,3520,3540,<br>3541,3620,3640,4150,4170,5010,5080,5090,5200,<br>5850,6020,6030 |
| ID | Code number assigned to subject and used by subject.<br>10010,10020,13010,13020,14020,14025 |
| J | Index for tables.<br>6030,6040,6050,6070 |
| K | Use as switch or counter.<br>545,560,580,720,740,760,770,780,820,840,860,870,880,<br>2000,2070,2080,4000,4030,4070,4110,6010,6050,6060,<br>13000,13028,13029,13030,13031,13032,13033,13034 |
| K0 | Rounded value of distance between joints.<br>8051,8055,11000,12025,13023,13028,13030,13037 |
| K1 | Thickness of first knuckle joint. |
| K2 | Thickness of second joint.<br>8045,8057,11010,12027,13026,14130 |
| K3 | Shape of first knuckle joint.<br>8054,8058,11020,12027,14130 |
| K4 | Shape of second joint.<br>8053,8059,11030 |
| K5 | Unused in this program.<br>4041,8060,11040 |
| K6 | Unused in this program.<br>8042,8062,11050 |
| K7 | Unused in this program.<br>8043,8066,11060 |

L Range of points for firsr parabola estimate and as switch.
180,182,187,188

LE Distance between parabola peaks.
8035,8051

LL If LL = 1 second finger measurement is required.
If LL = 2 all measurements are complete.
6,251,260,261

LP Last point
120,124,129,140,147,187,200,230,245,510,550,600,1020,2010,3520

L80 Record length is 80 bytes.
15,12000,13005,14010

M1 Start of good data for parabola calculation.
146,210,225,245,2080,7515

M2 Start of good data for first parabola calculatons.
210

N Point counter and index.
400,405,410,420,430,435,1005,1096,1110,1120,1130,1150,
1160,1170,1200,1230

NN Record number
25,91,9000,10020,12006,12010,12020

P1 Used in Regression Calc.
1170,1180,1220

P2 Used in Regression Calc.
1180,1190,1200

Pause$ Used as time delay to hold program while waiting for an entry.
60,80

PDL(0) Width of finger as read from machine thru paddle control input from Apple Computer.
410

PDL(3) Finger position as it moves thru machine.
420

Q Range of points on both sides of peak for first approximation of parabola.

701,705,730,801,830

R Range of points used for first parabola approximation.
Also used as record indicator in disc instruction.
126,127,128,129,6000,6020,6030,6050

S1 Marks end of good data for parabola calc.
147,215,230,2070

S2 Stores S1 so it can be used again.
215,240,7015

S5 Used as a switch in removing leading zeroes.
5005,5015,7015

S8 Intersection point of curves.
4050,4090,7515,7540,7550

S9 Intersection poinnt of curves.
4010,4050,7015,7040,7050

| | |
|---|---|
| SX | Used in Regression Calc.<br>1000,1030,1110,1130,1150,1170 |
| SY | Used in Rgression Calc.<br>1000,1040,1120,1130,1160,1190 |
| T | Used to count leading zeroes.<br>5020 |
| TP | Used in Regression Calc.<br>1190,1210 |
| TT | Stores point count of Raw Data.<br>120,435,3020 |
| TZ | Range of below the peak used to calculate an average value.<br>700,740,760,800,840,860 |
| W0 | Stores K0<br>11000,12020,13022,13029,13033,13036,14030 |
| W1 | Stores K1<br>11005,12020,13024,14040 |
| W2 | Stores K2<br>11010,12022,13026,14050 |
| W3 | Stores K3<br>11020,12022,14060 |
| W4 | Stores K4<br>11030,12022,14070 |
| W5 | Stores K5<br>11040,12025,14080 |
| W6 | Stores K6<br>11050,12025,14090 |
| W7 | Stores K7<br>11060,12025,14100 |
| X | Used in Regression Analysis and in setting up table for output curve.<br>1024,1025,1030,1050,1060,1070,1080,1095,2020,2050<br>4010,4030,4040,4050,4060,4070,4080,4090,4110,4120 |
| X0 | Used to compute parabola intersection.<br>8010,8030,8035 |
| X1 | Used to compute parabola intersection.<br>7020,7040,7520,7540,8000,8020,8035 |
| X2 | Same as X1<br>7030,7040,7050,7530,7540,7550 |
| X3 | Used in Regression Calc.<br>1000,1070,1180,1220 |
| X4 | Used in Regression Calc.<br>1000,1080,1200 |
| XM | Used in Regression Calc.<br>1150,1230 |

| | |
|---|---|
| XN | Location of first joint.<br>127,128,129,520,550,705,730,740,770,8043 |
| XP | Used in peak calc.<br>710,740,770,810,840,870 |
| XQ | Used in peak calc.<br>720,740,780,820,840,880 |
| XX | Used in Regression Analysis.<br>1060,1110,1170,1190,1200,1230 |
| XY | Used in Regression Calc.<br>1000,1050,1130 |
| Y | Used in Regression Calc. , writing table for output curve and in calc. cut off points in data table.<br>1026,1040,1050,1090,1095,2030,2070,4010,4030,4070,4100,4110 |
| YO | Used to calc. intersection points of parabolas.<br>Used to hold value mid finger bone length from record.<br>8030,8040,8052,13020,13023,13030,13037 |
| Y1 | Used to calc. intersection points of parabolas.<br>Used to hold thickness of mid finger 1st joint from record in file..<br>8020,8040,8045,13020,13024,13028,14120 |
| Y2 | Used to hold thickness of mid finger 2nd joint from record in file.<br>13020,12026,14130 |
| Y3 | Used to hold shape of mid finger 1st joint from record in file. (not used in this program)<br>13020,14140 |
| YM | Used in Regression calc.<br>1160,1230 |
| YN | Calc. thickness of first joint.<br>126,500,,52078,4041 |
| YY | Used in Regression Analysis.<br>1000,1090,1120 |
| ZY | Used in Regression Analysis.<br>1000,1095,1190 |
| ZO | Record value of index finger bone length.<br>13020,13022,13029,13033,13036,14030 |
| Z1 | Record value of index finger 1st joint.<br>13020,13024,14040 |
| Z2 | Record value of index finger 2nd joint.<br>13020,13026,14050 |
| Z3 | Record value (not use in this program)<br>13020,14060 |
| Z4 | Same as Z3.<br>13020,14070 |
| Z5 | Same as Z3.<br>13020,14090 |

Z6 Same as Z3.
13020,14100

Z7 Same as Z3.
13020,14110

DESCRIPTION OF SOFTWARE

The computer accepts input data from the machine via PDL(0) and PDL(3), stores it, then processes it to form a mathematical representation of the data. By storing curve parameters, an accurate representation of the data is preserved without the need for storing all the data points.

The data is divided into three sets of points. Each set is subjected to a Least Square Regression Analysis to fit three parabolas to the data points. The middle parabola is only used to generate a continous curve connecting the two outer curves.

The points may be plotted on hard copy for evaluation of the quality of curve fit.

Details of Program.

| Line | Function |
|---|---|
| 1 | Identification |
| 2 | Inventor |
| 3 | Revision Date |
| 5 | Clear all storage areas |
| 6 | Initialize |
| 10 | Defines access to Disc System |
| 15 | Opens Random access file of 80 byte length called IDENT |
| 20 | Read the first record in the file |
| 25 | Call the data in this record NN |
| 30 | Screen Instructions |
| 35 | Screen Instructions |
| 40 | Stores the word "New" or "Old" in area A$ |

| | |
|---|---|
| 45 | Decides where to direct the action if "New" |
| 50 | Decides where to direct the action if "Old" |
| 52 | Tests for entry of words other than Old or New |
| 55 | Screen Instruction |
| 56 | Screen Instruction |
| 57 | Screen Instruction |
| 60 | Holds everything on the screen until the operation begins |
| 65 | Directs the action to Line 100 |
| 70 | GOTO 11000 and return to the next line when "Return" is encountered |
| 71 | GOTO 1400 and return |
| 75 | Screen Instructions |
| 76 | Screen Instructions |
| 77 | Screen Instructions |
| 80 | Delays Program until next Instruction is followed |
| 85 | Directs the action to line 105 |
| 87 | If M = 1 this is a new user and the action goes to 12000 |
| 90 | If M = 0 this is and old user (name and number in file), goto 13000 |
| 91 | If a new user, last ID number is incremented by 1 and assigned to the user. The number and name are printed on screen. |
| 95 | End of the Program |
| 100 | Initialization |
| 105 | Read Input Data |
| 110 | Plot the input data on the screen and store it on disc |
| 111 | Dead space |
| 115 | Beginning of data points |
| 120 | End of data points is at end of point count |

122 Eliminate multiple readings at one absissa by averaging them. Fill in missing points by linear interpolation. This results in a new table where the absissas are equally space by 1 and the ordinates have actual data points if one existed, an average if more than one existed or an interpolated one which was calculated.

123 FP is the first point (5 points from beginning)

124 LP is the last point (5 points before the last one)

125 Find the magnitude and location of each peak representing the first and second knuckle joints of a finger.

126 Set the range of the points on either side of the peak from which the first parabolic approximation will be made. This is based on the thickness of the joint.

127 Sets limits on the range of points to make sure that the first point is not negative.

128 Set the staring point in the raw data set for the Regression Analysis.

129 Set the end point in the raw data set for the Regression analysis.

130 Least Square Regression Analysis, (To fit a curve to the data points), to calculate the parabola parameters A0, A1, and A2 for the first approximation of the large knuckle shape.

135 Similar to 123 setting the start above the zeros.

140 Similar to 124 setting the limit to the end of the table

145 Locate the range of points that lie in the vicinity of the estimated parabola. This is accomplished by using the first point to lie within five points of the calculated curve as the start (M1), and the last point to lie within five points of the curve at the end point (S1).

146 Set the first point for next approximation of the parabola by eliminating the first five points.

147 Set the last point for next approximation of parabola by eliminating the last five points.

150 Print points on screen used to curve fit the parabola.

165 Regression Analysis to determine coefficients of parabola using points seen in line 150.

170 Dead space

174 Save the parabola parameters before calculating the next parabola.

180 Set the range of points for the second joint parabola approximation based on the thickness of the joint.

182 Prevent the chance of negative values in the range.

187 Set the starting point of the second joint parabola approximation.

188 Set the end point of the second parabola approximation.

190 Calculate parabola coefficients (estimate) of joint.

191 Dead space

195 Set the first point of the range to be searched at the beginning of the data.

200 Set the end point of the range to be searched at the end of the data.

210 Store the data range of first curve.

215 Same as 210

220 Determine range of points close to estimated curve for joint near tip of finger.

225 Set range of points for more accurate second parabola estimate.

230 Same as 225

233 Display the data used for the more accurate parabola curve fit.

| | |
|---|---|
| 235 | Calculate the improved parabola coefficients by using the improved data range. |
| 240 | Set the start of the parabola data points between the two joints so as to connect the curves smoothly with a calculated parabola. (Used for visual presentation only) |
| 245 | Same as 240 (setting the end point). |
| 250 | Store parabola coefficients C0, C1 and C2 before using Regression formula again. |
| 251 | Increment LL by one to indicate that this was the first of two fingers to be inserted into the machine. |
| 255 | Calculate parabola constants for the middle parabola. |
| 257 | Calculate the intersection points of the parabolas and set up a table of calculated points for the three mathematical parabolas. Plot the three curves as one continuous curve which can be compared with the original raw data by overlaying on a light table. |
| 259 | Calculate the amplitude and location of the peaks of the two parabolas ~~representing~~ and the shape of the two finger joints. Print identification parameters. |
| 260 | Test for this being the first finger calculation. |
| 261 | Go To 87 Because this was the second finger. |
| 300-332 | Dimension the size of tables to store data. |
| 340 | Set point count N, to 0. |
| 399 | Return to line 100 |
| 400 | Initialize the N counter |
| 405 | Increment the N counter to count the points read directly from the machine. |
| 410 | Read position Paddle Input (0) which represents the |

width of the finger at the point the rollers are contacting it.

420 Reads the positon of Paddle Input (3) which represents the distance the finger has moved along its length from the start, perpendicular to the Paddle (0) measurement.

430 Repeats the paddle readings until the finger has moved 175 units of distance (about 175 x .0015" = 2.6")

435 Stores one less than the total number of points.

450 Returns to line 105.

500 Initialize values

510 Look at all the points within which the two peaks exist.

520 Calculate the highest peak

530 Steps to the next point in finding the peak.

540 GOSUB 700 to find the average height and location of the peak (used to avoid a random peak point from giving poor values of height and location).

545 Initialize K = 0

550 Setting the range of points to start looking for the second peak. (From ten points in from the start to the end of the data)

560 Test to see if the search has started up towards the second peak.

570 Searching for the minimum between the curves (There is a lower minimum point at the end of the data when the finger is removed. The minimum needed is the one between the two peaks. Line 560 test to see if the desired minimum has been passed).

580 If on an up slope increment K by 1.

590 Increment I by 1 and goto 510.

600 Set the range for searching for the second peak between the minimum between the curves and the end of the data. (This avoids the ambiguity of the first peak).

610 Finding the second peak height and location.

620 Increment I in the Quest for the peak.

630 Determine the average height and location of the second peak.

640 Return to line 125

700 Set the range to 2 for averaging the peak values. eg: Take all the points within 2 units of the maximum and average their value to calculate a peak.

701 Set parameter Q = 25

705 The Q = 25 was obtained experimentally as the maximum needed. This test reduces Q if it will produce negative values which would blow up the program.

710-720 Initialize counters to zero.

z730 Set the range to find the average peak by searching within Q units on either side of the actual peak for values within TZ of the maximum.

740 Add the magnitude of the points within TZ of the peak to the peak value. Add the location of these points to the location of the peak point. Add 1 to K to keep track of the number of points being averaged.

750 Increment I by 1 and goto line 730.

760 If there were less than 10 points used in calculating the average peak, then increment TZ by 1 and repeat the process until this condition is met.

770 Calculate the average of the locations. Take the rounded integral value and store it in XN.

780 Calculate the average magnitude. Take the rounded integral value and store it in "YN".

790 GOTO line 545

800-890 Same as 700-790 except this is for the second peak and BN replaces XN and EN replaces YN.

1000-1270 This is the standard Least Square Regression Analysis Formula which takes the range of points defined by FP and LP and calculates the coefficients of the parabola which best fits these points.

1400-1440 SET TABLES TO Ø

2000 Set K = 0

2010 Set the range of points for a For-To statement.

2020 Set X = the absissa, F(I), in the table.

2030 Set Y = the ordinate, E(I), in the table.

2050 DD is the Y coordinate of the parabola whose parameters were calculated in the Regression Analysis when X = E(I) is substituted for the independent variable.

2070 If F(I), the raw data point found when the PDL(3) was read, is greater than 5, (used to eliminate leading small numbers), and the raw data point is less than 4 units from the curve, then K = K+1 and S1 stores the raw data point.

2080 When K = 1, the occurance marks the first point that is close to the curve. This occurance is recorded by setting M1 = F(I). M1 becomes the start of the points to be used for the next parabola curve fit. S1 stores all point locations within range. The last one is the location of the last point to be used in the parabolic fit.

2090 Increment I and goto 2010.

2100 Goto line 146.

3000-3060 Plot the raw data in High Resolution Graphics on the screen.

3500-3590 Plot the raw data of the points to be used in calculating the parabola in High Resolution Graphics.

3600-3690 Plot the raw data of the points to be used in calculating the second parabola.

4000 Set K = 250 (range limit).

4005 Calculate the intersection point of parabolas for plotting.

4010-4040 Calculate the values to the intersection point with the next parabola and store these values in the A(X),B(X) tables. (Note that these tables were initialized and reused to save computer storage space)

4041 Store N in K5

4045 Calculate the intersection point between the middle and end parabolas.

4050-4120 Same as 4010-4040

4130-4170 Plot the parabolas as one continuous curve on the screen.

4524 GOTO 257

5000-5005 Initialize counters.

5010 Set the "FOR" statement range.

5015 Test for B(I) being greater than 0. If true set S5 = 1.

5020 Count leading zeroes and step to next I in "FOR NEXT" statement line 5010.

5040-5044 If more than one value is read for a PDL(3) absissa reading, the readings are averaged. This average is placed in the table to replace the multiple readings.

5050-5060 Place non multiple readings directly in the table using the absissa value as index for the table.

5070 Computing the end of the table.

5080 Increment I and goto 5010.

5090 Set the limits from the beginning of the reformed table to the end minus four.

5100 If there is a missing point in the table as evidenced by a zero, goto 6000 for linear interpolation to fill in the blanks.

5200 Increment I and goto 5090.

5810-5850 Plot the corrected curve on the screen.

5900 Goto line 123.

6000-6070 If one or more zeros exist, find the point immediately preceeding the zeros and the one-following the last contiguous zero and replace the zeros with the average for the points as calculated by linear interpolation.

6080 Goto 5200.

7000-7050 The intersection of two parabolas gives a quadradic. If they do not intersect, the solution will have imaginary roots. If the discriminant is negative as per line 7015, then the intersection is approximated so as to make a plot possible although it may not be smooth. The larger of the two roots is selected as the correct one and used.

7060 Goto 4005.

7500-7550 Same as 7000-7050 except for the second pair of parabolas.

7560 Goto4050.

8000 Compute the location of the second peak (joint nearer tip of finger)

8010 Compute the location of the first peak (joint nearer palm)

8020 Compute thickness of second joint.

8030 Compute thickness of first joint.

8035 Compute the distance between joints.

8040 Compute the difference in thickness of joints.

8042 Define K6 as thickness of second joint.

8043 K7 unused

8045 Calculate absolute value of the rounded value of second joint thickness.

8050 Unused in this version of program.

8051-8054 Round off values and set scale factors.

8055 K0 is the distance between the parabola peaks.

8056 K1 is the thickness of #1 joint.

8057 K2 is the thickness of #2 joint

8058 K3 is the shape of #1 joint

8059 K4 is the shape of #2 joint.

8060 Unused

8062 Unused

8066 Unused

8070 Goto line 260. 260.

9000-9010 Screen Instructions

9020 Inputs the name of a new user

9030 Sets Switch M1 to 1 to indicate a new user.

9040 Returns to line 50 for the next instruction.

10000 Screen Instruction.

10010 Stores the user ID number in ID.

10020 Tests ID number for being with the range of assigned numbers.

10070 Returns the program to line 52 for the next instruction.

11000-11060 Stores K0 - K7 in W0 - W7

11070 Returns to line 71 for the next instruction.

12000 Opens file named "Ident" with length 80.

12005 Instruction to write to record #1

12006 Write the newly assigned ID number in record #1 (This keeps track of the highest assigned ID number)

12010 Write to record NN+1 the new record.

| | |
|---|---|
| 12020-12027 | Write all the new values to the new record. |
| 12030 | Close the file "Ident". |
| 12040 | Return the action to line 90. |
| 13000 | Set K = 0 |
| 13005 | Open file "Ident" of length 80. |
| 13010 | Read record number as ID. |
| 13020 | Store the record components in ID thru Y3. |
| 13021 | Close the file. |
| 13022-13023 | Print errors on screen. |
| 13024 | Calculate the difference between the stored value and new reading as corrected for Index Joint #1. |
| 13025 | Print the error of line 13024 on screen. |
| 13026 | Same as line 13024 except for Joint #2. |
| 13027 | Print error calculated in line 13026. |
| 13028 | If the absolute Mid length error > 4 subtract 1 from K. |
| 13029 | If the absolute Index length error < 2.1 then add 1 to K. |
| 13030 | If the absolute Mid length error < 2.1 then add 1 to K. |
| 13031 | If the absolute error of Joint #1 < 5.1 then add 1 to K. |
| 13032 | If the absolute error of Joint #2 < 5.1 then add 1 to K. |
| 13033 | If the absolute Index length error > 4 then subtract 1 from K. |
| 13034 | If K > 1 the identification is positive and line 14000 is next. |
| 13035 | K was less than 2 and the ID is bad. Rejection. |
| 13036-13039 | Print the errors that led to the Rejection on the Screen. |
| 13050 | Return to line 91. |
| 14000 | Print the name of the person whose finger passed the test. |
| 14010 | Open Ident file. |
| 14020 | Write to record # ID. |
| 14025 | Write ID and name to record. |

14030-14140 Correct all readings of those who pass the test by adding 20% of the difference between the record value and the latest readings. Store these new values in the file for future use.

15000 Goto to 13050.

I claim:

1. A method of verifying the identity of an unknown person, comprising the steps of:
selecting at least one test joint of at least one test finger of a known person;
measuring the thickness of said test joint;
storing said measurement;
measuring the same joint thickness dimension of an unknown person;
comparing said joint thickness dimensions of said known and unknown persons to determine the degree of similarity therebetween;
and deciding whether said degree of similarity is acceptable as an indication of identity according to a selected criterion.

2. A method as in claim 1 wherein the thicknesses of said test joint along two different axes are measured and compared and used as a basis for said decision.

3. A method as in claim 1 further comprising the steps of:
selecting a second finger joint of a known person to be a second test joint;
measuring the thickness of said second test joint;
storing said measurement;
measuring the same second test joint thickness dimension of said unknown person;
comparing said second test joint dimensions of said known and unknown persons to determine the degree of similarity therebetween;
and deciding whether said degree of similarity between said first and second test joint thicknesses is acceptable as an indication of identity according to a selected criterion.

4. A method as in claim 3 further comprising the steps of:
measuring the separation between said test joints of said known person;
storing said measurement;
measuring the same joint separation dimension of an unknown person;
comparing said joint separation dimensions of said known and unknown persons to determine the degree of similarity therebetween;
and deciding whether said degree of similarity between said first and second test joint thicknesses and said joint separations is acceptable as an indication of identity according to a selected criterion.

5. A method as in claim 4 wherein said comparison step comprises the steps of:
selecting a figure of merit;
incrementing said figure of merit by a selected amount when the absolute value of the difference between at least one pair of said test joint thickness dimensions is less than a selected first value;
and decrementing said figure of merit by a selected amount when the absolute value of said last mentioned difference is greater than a selected second value.

6. A method as in claim 1 further comprising a procedure for compensating for short-term changes in joint thickness, including the steps of:
selecting another finger joint of said test finger to be a reference joint;
measuring the thickness of said reference joint of said known person; storing said reference joint measurement;
measuring the thickness of said reference joint of said unknown person;
calculating the difference between said reference joint thickness measurements;
algebraically adding said difference between said reference joint thickness measurements to said stored test joint thickness measurement to produce a corrected test joint thickness measurement;
and using said corrected test joint thickness measurement in said comparison step.

7. A method as in claim 6 wherein said reference joint is on a separate finger from said test finger, and corresponds to said test joint.

8. A method as in claim 1 further comprising a procedure for compensating for long-term changes in finger dimensions, including the steps of:
calculating the difference between said test joint thickness dimensions of said known and unknown persons;
modifying said stored test joint thickness dimension by algebraically adding thereto at least a selected fraction of said difference in the event that said criterion of identity is satisfied;
and thereafter using said modified test joint thickness dimension for subsequent comparisons.

9. A method as in claim 1 wherein:
said measuring steps include:
measuring the thickness of said test finger at a plurality of data points including the location of said test joint and a range of locations dispersed longitudinally of said test finger in front of and behind said test joint;
and measuring the position of each of said data point locations longitudinally of said test finger;
and said comparison step includes:
calculating respective comparison curves of a selected type which are peaked and which fit a selected range of said data points best for each of said persons;
determining respective peak values for said comparison curves as an indication of the thicknesses of said test finger joints for each of said persons;
and comparing said respective peak values for said persons to determine the degree of similarity therebetween;
and said deciding step includes deciding whether said degree of similarity between said peak values is acceptable as an indication of identity according to a selected criterion.

10. A method as in claim 9 wherein:
each said comparison curve has a standard equation including a set of coefficients;
and comparing said respective curve coefficients for said persons to determine the degree of similarity therebetween;
and said deciding step includes deciding whether said degree of similarity between said coefficients is acceptable as an indication of identity according to a selected criterion.

11. A method as in claim 10 wherein said comparison curve is a parabola of the form $y=ax^2+bx+c$, and said coefficients compared are a, b and c.

12. A method as in claim 9 wherein:
said calculation of said comparison curves includes the steps of:
calculating respective preliminary curves of said selected type which fit respective selected ranges of said data points best for each of said persons;
establishing criteria of closeness between said preliminary curves and respective ranges of said data points in the vicinity of the peaks of said preliminary curves;
discarding any of said data points which do not meet said criteria;
and calculating said respective comparison curves to best fit the remaining data points for each of said persons.

13. A method as in claim 12 wherein said step of calculating each said preliminary curve comprises the steps of:
determining a peak data point from among all said data points;
and selecting said preliminary curve to pass through the undiscarded data points in the vicinity of said peak data point.

14. A method as in claim 13 wherein said step of determining a peak data point from among all of said data points comprises the steps of:
selecting a preliminary peak data point;
selecting a predetermined number of said data points on either side of said preliminary peak data point;
calculating the average coordinates of said preliminary peak data points and said selected points on either side thereof;
and employing said average coordinates as the coordinates of said peak data point about which said first curve is calculated.

15. A method as in claim 12 wherein said preliminary and comparison curves are parabolas.

16. A method as in claim 9 wherein said comparison curves ae parabolas.

17. A method as in claim 16 or 15 wherein the method of least square fit is used to fit said parabola to its constituent data points.

18. Apparatus for verifying the identity of an unknown person, comprising:
means for measuring the thickness of a test joint of a test finger of known and unknown persons respectively;
means for storing said test joint thickness dimension of said known person;
means for comparing said test joint thickness dimension of said unknown person to said stored dimension to determine the degree of similarity therebetween;
and means for determining whether said degree of similarity is acceptable as an indication of identity between said known and unknown persons according to a selected criterion.

19. Apparatus as in claim 18 wherein said measuring means comprises:
a pair of jaw means;
means movably mounting at least one of said jaw means for opening and closing movement with respect to the other;
means for opening said moveable jaw means to admit said finger therebetween;
means yieldably biasing said moveable jaw means toward a closed position whereby to follow the contours of said finger at it is moved longitudinally between said jaw means;
and transducer means responsive to said moveable jaw means for providing an electrical jaw displacement signal representing the instantaneous displacement of said moveable jaw means during said finger movement, whereby the profile of said jaw displacement signal during the time of said finger movement represents the thickness contour of said finger.

20. Apparatus as in claim 19 wherein:
said moveable jaw means comprises a slide member;
said mounting means comprises guideway means slideably mounting said slide member for linear motion of said moveable jaw means toward and away from the other of said jaw means.

21. Apparatus as in claim 20 wherein:
said transducer means is of the type requiring a rotary drive, and includes rotary drive gear means;
and said moveable jaw means has coupled thereto linear drive rack means in driving engagement with said rotary drive gear means for operation of said transducer means by said linear motion of said moveable jaw means.

22. Apparatus as in claim 20 further comprising: solenoid means magnetically coupled to said slide member;
and means supplying alternating current energization to said solenoid means to apply a magnetic dither impulse to said slide member.

23. Apparatus as in claim 19 further comprising:
data processing means responsive to said jaw displacement signal and arranged to determine a peak value attained by each said thickness contour as a measure of the thickness of each said test joint;
said data processing means being arranged to compare said peak values relating to said known and unknown persons respectively and to determine the degree of similarity between the thicknesses of said test joints.

24. Apparatus as in claim 23 wherein:
said data processing means is arranged also to determine second peak values of each said thickness contour and to compare said second peak values relating to said known and unknown persons respectively, to determine the degree of similarity between the thicknesses of second test joints.

25. Apparatus as in claim 19 further comprising:
data processing means responsive to said jaw displacement signal and arranged to determine both first and second peak values attained by each said thickness contour as a measure of the thicknesses of said first and second test joints respectively;

means for sensing the degree of insertion of a finger into said apparatus;

and transducer means responsive to said finger insertion sensing means for providing an electrical signal proportional to said degree of finger insertion;

said data processing means being further arranged to receive said finger insertion signal, to determine the finger displacements which are correlated with each of said peak values of said thickness contours, and to substract said correlated finger displacement values from each other to calculate the separation between said test joints of each said person;

said data processing means being further arranged to compare said joint separation values relating to said known and unknown persons respectively, to determine the degree of similarity therbetween.

26. Apparatus as in claim 25 wherein:

said finger insertion sensing means comprises finger support means, and means mounting said finger support means for linear motion in response to insertion of a finger into said apparatus;

and said insertion-responsive transducer means is of the type requiring a linear drive, and including linear drive means coupled to said finger support means for linear movement therewith.

27. Apparatus as in claim 26 further comprising means for biasing said finger support means in a direction to oppose finger insertion.

* * * * *

UNITED STATES PATENT AND TRADEMARK OFFICE

CERTIFICATE OF CORRECTION

PATENT NO. : 4,669,487

DATED : June 2, 1987

INVENTOR(S) : Edward Frieling

It is certified that error appears in the above-identified patent and that said Letters Patent is hereby corrected as shown below:

Col. 8, line 2, change "resistance" to --resistances--.

Col. 9, line 49, change "when" to --then--.

Col. 10, line 41, change ";" to --:--.

Signed and Sealed this

Eighteenth Day of August, 1987

*Attest:*

DONALD J. QUIGG

*Attesting Officer* *Commissioner of Patents and Trademarks*